(12) United States Patent
Peippo

(10) Patent No.: US 11,053,099 B2
(45) Date of Patent: Jul. 6, 2021

(54) RAIL STRUCTURE FOR CRANE BEARING WHEEL, AND COMBINATION OF BEARING WHEEL AND RAIL STRUCTURE

(71) Applicant: Konecranes Global Corporation, Hyvinkää (FI)

(72) Inventor: Juha Peippo, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 532 days.

(21) Appl. No.: 15/779,764

(22) PCT Filed: Dec. 1, 2016

(86) PCT No.: PCT/FI2016/050848
§ 371 (c)(1),
(2) Date: May 29, 2018

(87) PCT Pub. No.: WO2017/093612
PCT Pub. Date: Jun. 8, 2017

(65) Prior Publication Data
US 2019/0284026 A1    Sep. 19, 2019

(30) Foreign Application Priority Data

Dec. 1, 2015 (FI) .................................... 20155904

(51) Int. Cl.
*B66C 7/08* (2006.01)
*B60B 17/00* (2006.01)
*B66C 9/08* (2006.01)

(52) U.S. Cl.
CPC ............ *B66C 7/08* (2013.01); *B60B 17/0082* (2013.01); *B66C 9/08* (2013.01)

(58) Field of Classification Search
CPC .... B66C 7/00; B66C 7/08; B66C 9/00; B66C 9/08; B60B 17/00; B60B 17/0082
See application file for complete search history.

(56) References Cited

U.S. PATENT DOCUMENTS

| 574,599 A | * | 1/1897 | Caldwell | .................. E01B 5/02 |
| | | | | 238/122 |
| 4,139,154 A | * | 2/1979 | Giroud | ...................... B66C 7/08 |
| | | | | 238/122 |

(Continued)

FOREIGN PATENT DOCUMENTS

| CN | 202298370 U | 7/2012 |
| CN | 104671081 A | 6/2015 |

(Continued)

OTHER PUBLICATIONS

International Preliminary Report on Patentability (PCT/IPEA/409) issued in PCT/FI2016/050848, dated Mar. 8, 2018.
(Continued)

*Primary Examiner* — Jason C Smith
(74) *Attorney, Agent, or Firm* — Birch, Stewart, Kolasch & Birch, LLP

(57) ABSTRACT

A rail structure for a bearing wheel of a crane includes surfaces receiving rolling and horizontal forces. The rail structure includes two surfaces located at a distance from one another and receiving rolling forces. The rail structure preferably includes at least one basic plate and, arranged on top of it, a wear surface arrangement. The surfaces receiving rolling forces are formed to this wear surface arrangement at a distance from one another. A combination of a bearing wheel and a rail structure of the above type is also disclosed.

12 Claims, 1 Drawing Sheet

(56) References Cited

U.S. PATENT DOCUMENTS

| | | | | |
|---|---|---|---|---|
| 5,992,913 | A | * | 11/1999 | Becker ...................... B66C 9/08 |
| | | | | 295/21 |
| 7,204,782 | B2 | * | 4/2007 | Ciszak ................. B60K 17/046 |
| | | | | 475/331 |
| 8,950,569 | B1 | * | 2/2015 | Hanks .................... B65G 23/04 |
| | | | | 198/585 |
| 2017/0349412 | A1 | * | 12/2017 | Peippo ...................... B66C 6/00 |
| 2019/0284026 | A1 | * | 9/2019 | Peippo ................ B60B 17/0082 |

FOREIGN PATENT DOCUMENTS

| | | |
|---|---|---|
| DE | 196 27 296 A1 | 1/1998 |
| JP | 3100133 B1 | 10/2000 |

OTHER PUBLICATIONS

International Search Report (PCT/ISA/210) issued in PCT/FI2016/050848, dated Mar. 3, 2017.
Written Opinion of the International Searching Authority (PCT/ISA/237) issued in PCT/FI2016/050848, dated Mar. 3, 2017.

* cited by examiner

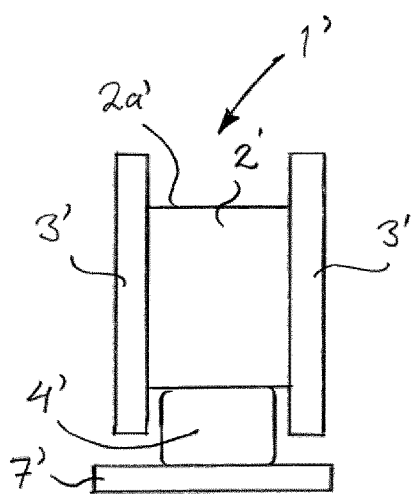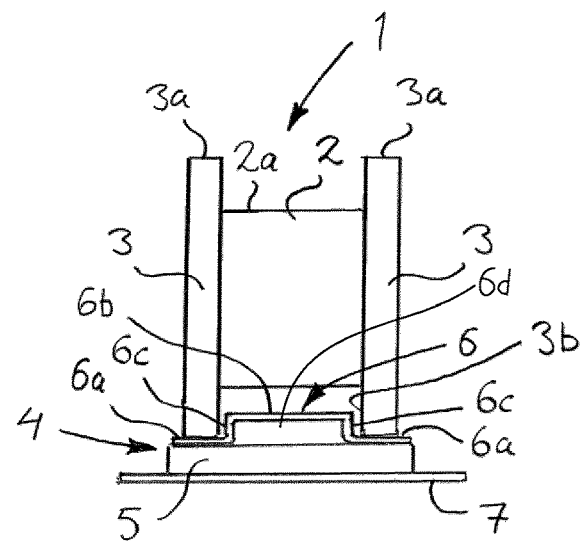
Fig. 1    Fig. 2
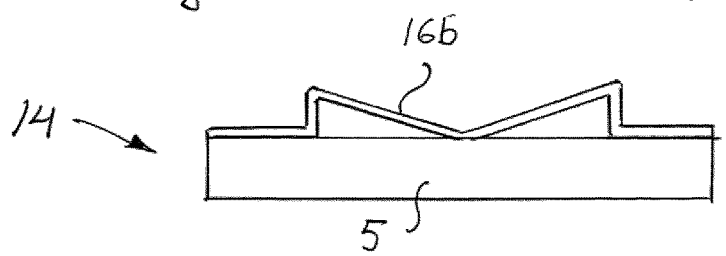
Fig. 3
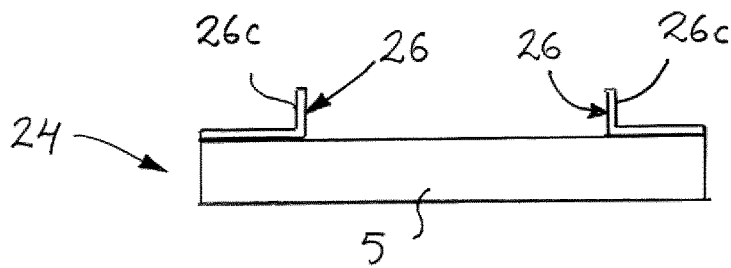
Fig. 4
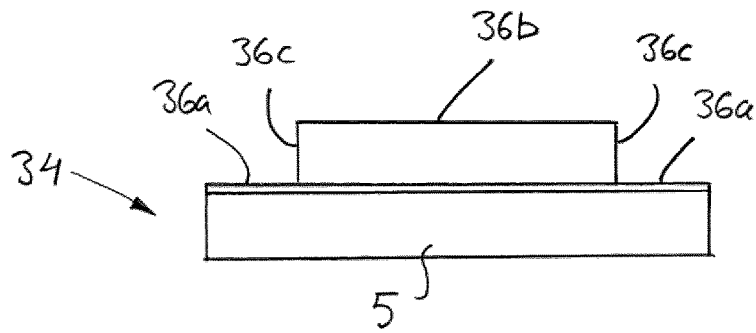
Fig. 5
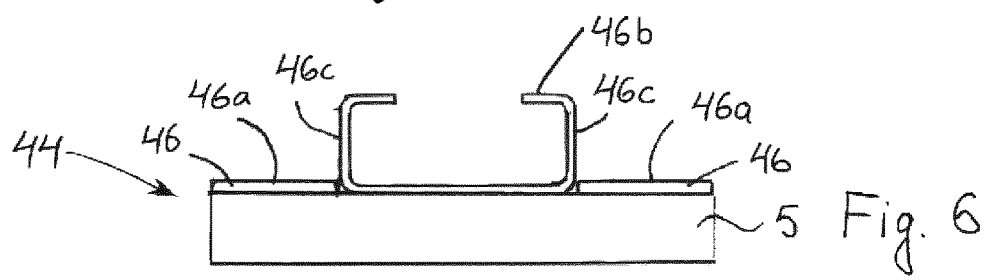
Fig. 6

RAIL STRUCTURE FOR CRANE BEARING WHEEL, AND COMBINATION OF BEARING WHEEL AND RAIL STRUCTURE

BACKGROUND OF THE INVENTION

The invention relates to a rail structure for a bearing wheel of a crane, the rail structure comprising surfaces receiving rolling and horizontal forces, whereby it comprises two surfaces located at a distance from one another and receiving rolling forces. The invention further relates to a combination of a bearing wheel and a rail structure of the above type.

In bearing wheels or rail wheels used in cranes, the middle portion of the wheel serves as its rolling portion, the circumferential surface of the portion receiving vertical forces. Cylindrical end portions, which typically are narrow flanges, in turn participate, when needed, in receiving lateral or horizontal forces caused by driving movements of the crane. A conventional bearing wheel is made of a single blank, the size of the blank of origin being determined by the outer diameter of the end flanges. In the conventional solution, total vertical forces may be thought of as travelling through the rail structure into the base via a single support reaction point. In a crane structure, an attempt is usually made to position the web of the beam structure serving as the main girder of the crane to this point. In a prior art rail structure of this type, the material of the structure is the same, e.g. common structural steel S355, across the entire cross-sectional surface.

A problem with the prior art structure is precisely the transfer of vertical forces through the single support reaction point to the main girder, i.e. a point load on the main girder. In main girders made of light composite structures in particular this may cause local crushing loads that are too high, whereby the main girder web may lose its load bearing capability.

SUMMARY OF THE INVENTION

An object of the invention is thus to provide an improved rail structure for a bearing wheel and an improved combination of a bearing wheel and a rail structure so that the above-mentioned problems can be solved. The object of the invention is achieved by a rail structure, characterized in that the rail structure comprises at least one basic plate and a wear surface arrangement arranged on top of it, whereby surfaces receiving rolling forces are formed to this wear surface arrangement at a distance from one another.

Preferred embodiments of the invention are disclosed in the dependent claims.

The invention is based on a distribution of rolling forces of the structure described above to two vertical components located at a distance from one another. This is implemented by using flanges or end portions of a bearing wheel as its rolling surface instead of using the middle portion thereof as in the prior art. The two surfaces of the rail structure located a distance from one another and receiving rolling forces then transfer these forces to a larger area on the surface of the main girder. When the distance between the end portions of the bearing wheel is dimensioned according to the distance between modules or webs of a main girder having a composite structure, for example, a vertical load can be distributed to these webs or interconnected vertical module walls.

The novel rail structure type has made it possible to also solve the surface pressure problem between the bearing wheel and the rail structure. After a certain surface pressure threshold, dimensioning instructions require that the rail structure strength is increased. Steel of strength grade S355 is commonly used as raw material for rail structures, the maximum allowed projection surface pressure being then 7.2 MPa. By increasing the break resistance of the wear surface to a value 700 MPa (F.E.M 1.001 Rules for the design of hoisting appliances, booklet 9), an allowed surface pressure value of 8.5 MPa is obtained, which equals a 28% reduction in the roll cylinder volume.

LIST OF FIGURES

The invention is now described in closer detail by means of the preferred embodiments and with reference to the accompanying drawings, in which:

FIG. 1 shows a prior art bearing wheel and rail structure of a crane;

FIG. 2 shows a bearing wheel and a rail structure of a crane according to the invention; and FIGS. 3 to 6 show some alternative rail structures according to the invention.

DETAILED DESCRIPTION OF THE INVENTION

With reference to FIG. 1, a prior art bearing wheel or rail wheel 1' of a crane is shown, the wheel comprising a cylindrical middle portion 2' with cylindrical end portions 3' arranged coaxially in relation thereto at both its ends and having a diameter that is greater than that of the middle portion 2'. The middle portion 2' serves as the roll portion of the bearing wheel 1', its outer circumference 2a' receiving vertical and rolling forces. The cylindrical end portions 3', which typically are simply narrow flanges, in turn participate, when necessary, in receiving lateral or horizontal forces caused by the driving movements of the crane. The bearing wheel 1' is typically made of a single blank, and the outer diameter of the end portions 3' determine the size of the blank of origin. In the conventional solution above, total vertical forces may be thought of as travelling through a one-piece, substantially rectangular rail structure 4' to a base 7' (such as an upper flange of a main girder beam) via a single support reaction point. In a crane structure, the web of a beam structure, which typically serves as the main girder in the structure, is attempted to be positioned to this point. In this prior art solution, the rail structure 4' is of the same material, such as common structural steel S355, across its entire cross-sectional surface.

Next, a reference is made to FIG. 2 which illustrates a combination of the bearing wheel 1 and the rail structure 4 according to the invention. The bearing wheel 1 comprises a cylindrical middle portion 2 and, attached to both ends thereof coaxially in relation to it, cylindrical end portions 3, whose diameter is greater than the diameter of the middle portion 2. This differs from the prior art in that the outer circumferences 3a of the end portions 3 and the inner circumferential rims 3b of the end portions 3 abutting on these serve as surfaces receiving rolling and horizontal forces. In other words, the middle portion 2 is not in any contact at all with the rail structure 4 in a vertical direction, i.e. the outer circumference 2a of the middle portion 2 is at a distance from the rail structure 4 and therefore the outer circumferences 3a of the end portions 3 receive all vertical or rolling forces. Although the outer circumferences 3a may also receive some horizontal forces, the horizontal forces (lateral guiding forces) are mainly received by the inner circumferential rims 3b. Reception of vertical forces is described below.

With further reference to FIG. 2, to render the above-described operation of the bearing wheel 1 possible, the rail structure 4 according to the invention comprises, correspondingly, two surfaces 6a receiving rolling forces and located at the distance from one another in the cross direction of the rail structure 4. In that case the rail structure 4 preferably comprises at least one basic plate 5 and, arranged on top of it, a wear surface arrangement 6, the surfaces 6a receiving rolling forces being then formed to this wear surface arrangement 6 at a distance from one another. The wear surface arrangement 6 comprises a plate having a protruding middle portion 6b between the surfaces 6a receiving rolling forces, the side edges 6c of the middle portion that face away from each other forming surfaces receiving horizontal forces. Reference numeral 7 denotes a fastening base of the rail structure, such as a top surface of the main girder of the crane. The plate comprising the wear surface arrangement 6 may be of a stronger material than the basic plate 5. In that case, the material of the rail structure 3 does not need to be replaced entirely by a stronger material even if surface pressure were to increase. On the other hand, by changing the thickness of the basic plate 5 it is possible to adjust the stiffness of the rail structure 3 as desired. The plate comprising the wear surface arrangement 6 may be joined to the basic plate 5 by laser welding, for example. A cavity 6d left between the basic plate 5 and the wear surface arrangement 6 may be filled, when necessary, with material supporting the rail structure 4, and the cavity 6d may be utilized, when necessary, for implementing an extension of the main girder, for example.

FIG. 3 shows an alternative rail structure 14. It differs from the structure shown in FIG. 1 only in that there the protruding middle section 16b is groove-like, its middle portion being lower down than its sides. The groove thus formed may be utilized for cabling works or for crane parking, for example.

In a second alternative rail structure 24 according to FIG. 4 the wear surface arrangement 26 comprises two plates (L-profiles) at a distance from one another, whose edges 26c facing away from one another are turned upwards, whereby the edges from surfaces receiving horizontal forces. This structure may be used when the horizontal forces caused by the driving movement of the crane are small. The space left between the L-profiles 26 may be utilized e.g. as shown in the structure according to FIG. 3.

FIG. 5 shows yet another alternative implementation of the rail structure 34, in which there is a middle piece 36b arranged between surfaces 36a receiving rolling forces, the middle piece extending higher up than the surfaces and its side edges 36c facing away from one another form surfaces receiving horizontal forces. In that case the middle piece 36b is preferably fastened to a smooth plate comprising the surfaces 36a receiving rolling forces.

FIG. 6 shows yet another advantageous implementation of a rail structure 44, in which there is a C-rail 46b fastened to the basic plate 5, preferably by welding, with its sides 46c forming surfaces receiving horizontal forces. The surfaces 46a receiving rolling forces are preferably arranged to two plates 46 attached to the C-rail 46b on both sides thereof, the plates being attached to the basic plate 5 either by intermittent welding or gluing. In this solution in particular the replacement of parts that wear out the most, i.e. the plates 46 receiving rolling forces, is easy because the C-rail 46b receiving horizontal forces does not need to be detached during the works, unless it is otherwise in need of replacement. Then again, the replacement of the entire wear surface arrangement is fairly easy also in the arrangements according to FIGS. 2 to 5, especially if the fastening of the wear surface arrangement has been mainly carried out by gluing.

As to the above-described rail wheel 1, the middle portion 2 may be hollow and the end portions 3 may be of different widths, when loading so requires. The middle portion 2 and the end portions 3 may be attached together e.g. by gluing, bolting or welding. When necessary, also the middle portion 2 may be made to receive vertical forces, i.e. travel along the conventional rail structure 4' according to FIG. 1, at least temporarily, e.g. in the case of a higher load or travel speed adjustment than usually.

The disclosed invention is only intended to illustrate a basic idea according to the invention. A person skilled in the art may, however, vary its details within the scope of the attached claims.

The invention claimed is:

1. A rail structure for a bearing wheel of a crane, the rail structure comprising:
   surfaces receiving rolling and horizontal forces, two of said surfaces being located at a distance from one another and receiving rolling forces;
   at least one basic plate; and,
   a wear surface arrangement arranged on top of the at least one basic plate,
   wherein the surfaces receiving rolling forces are formed to the wear surface arrangement at a distance from one another,
   wherein the wear surface arrangement comprises a plate having a protruding middle portion between the surfaces receiving rolling forces, and side edges of the middle portion that face away from one another form the surfaces receiving horizontal forces, and
   wherein the protruding middle portion is grooved and thus a middle area thereof is lower down than the side edges.

2. The rail structure as claimed in claim 1, wherein between the surfaces receiving rolling forces, there is arranged a middle piece that extends higher up than said surfaces receiving rolling forces and whose side edges facing away from one another form the surfaces receiving horizontal forces.

3. The rail structure as claimed in claim 2, wherein the middle piece has been fastened to a plate comprising the surfaces that receive rolling forces.

4. The rail structure as claimed in claim 1, wherein attached to the basic plate there is a C-rail whose sides form surfaces receiving horizontal forces and the surfaces receiving rolling forces are arranged to two plates fastened to the C-rail on both sides thereof.

5. A rail structure for a bearing wheel of a crane, the rail structure comprising:
   surfaces receiving rolling and horizontal forces, two of said surfaces being located at a distance from one another and receiving rolling forces;
   at least one basic plate; and,
   a wear surface arrangement arranged on top of the at least one basic plate,
   wherein the surfaces receiving rolling forces are formed to the wear surface arrangement at a distance from one another, and
   wherein the wear surface arrangement comprises two plates at a distance from one another, whose edges facing away from one another are turned upwards, whereby the edges form the surfaces receiving horizontal forces.

6. An arrangement comprising:
   a bearing wheel of a crane; and
   a rail structure for the bearing wheel, which bearing wheel has a cylindrical middle portion, at both ends of the middle portion cylindrical end portions arranged coaxially in relation to the middle portion, the end portions having a diameter that is greater than the diameter of the middle portion, and surfaces-receiving rolling and horizontal forces, and the rail structure having corresponding surfaces receiving rolling and horizontal forces, the surfaces of the bearing wheel that receive rolling and horizontal forces comprising outer circumferences of the end portions and inner circumferential rims of the end portions abutting thereto, and that, correspondingly, the rail structure comprises two surfaces located at a distance from one another and receiving rolling forces, wherein the rail structure comprises at least one basic plate and a wear surface arrangement arranged on top of the at least one basic plate, the surfaces receiving rolling forces being formed to this wear surface arrangement at a distance from one another.

7. The arrangement as claimed in claim 6, wherein the wear surface arrangement comprises a plate with a protruding middle portion between the surfaces that receive rolling forces, and side edges of the section facing away from one another form the surfaces receiving horizontal forces.

8. The arrangement as claimed in claim 7, wherein the protruding middle portion is grooved, whereby a middle area thereof is lower down than the side edges.

9. The arrangement as claimed in claim 6, wherein the wear surface arrangement comprises two plates at a distance from one another, edges of the plates that face one another being turned upwards, whereby these edges thus form the surfaces receiving horizontal forces.

10. The arrangement as claimed in claim 6, wherein between the surfaces that receive rolling forces there is arranged a middle piece extending higher up than the surfaces and side edges of the middle piece that face one another form the surfaces receiving horizontal forces.

11. The arrangement as claimed in claim 10, wherein the middle piece is fastened to a plate comprising the surfaces that receive the rolling forces.

12. The arrangement as claimed in claim 6, wherein attached to the basic plate there is a C-rail whose sides form the surfaces receiving horizontal forces and the surfaces receiving rolling forces are arranged to two plates fastened to the C-rail on both sides thereof.

* * * * *